United States Patent [19]
Berger et al.

[11] Patent Number: 5,274,644
[45] Date of Patent: Dec. 28, 1993

[54] EFFICIENT, RATE-BASE MULTICLASS ACCESS CONTROL

[75] Inventors: Arthur W. Berger, Fair Haven; Rodolfo A. Milito, Piscataway; Ward Whitt, Basking Ridge, all of N.J.

[73] Assignee: AT&T Bell Laboratories, Murray Hill, N.J.

[21] Appl. No.: 788,075

[22] Filed: Nov. 5, 1991

[51] Int. Cl.⁵ .............................................. H04J 3/16
[52] U.S. Cl. ................................. 370/95.1; 370/85.4
[58] Field of Search ................ 370/85.2, 94.1, 94.3, 370/95.1, 85.4, 85.7, 85.8, 95.2; 340/825.03, 825.5; 364/401, 402, 406, 408

[56] References Cited

U.S. PATENT DOCUMENTS

| | | | |
|---|---|---|---|
| 4,616,359 | 10/1986 | Fontenot | 370/60 |
| 4,726,018 | 2/1988 | Bux et al. | 370/94.1 |
| 4,766,530 | 8/1988 | Roslund | 340/825.5 |
| 4,769,810 | 9/1988 | Eckberg et al. | 370/94.1 |
| 4,839,891 | 6/1989 | Kobayashi et al. | 370/94.1 |
| 4,984,264 | 1/1991 | Katsube | 370/60 |
| 5,014,265 | 5/1991 | Hahne et al. | 370/60 |

*Primary Examiner*—Douglas W. Olms
*Assistant Examiner*—Atit Patel
*Attorney, Agent, or Firm*—Barry H. Freedman

[57] ABSTRACT

A fair and efficient admission scheme enables sharing of a common resource among N traffic classes, such that each class is guaranteed (on a suitable long-term basis) a contracted minimum use of the resource, and each class can go beyond the contract when extra resource capacity becomes temporarily available. The scheme operates in an open loop mode, and thus does not require information describing the current status of the resource. For the purposes of description, one form of the invention is best described in terms of "tokens" and "token banks" with finite sizes. Our scheme uses one token bank per class (bank 'i', i=1, . . . ,N), plus one spare bank. Class 'i' is preassigned a rate, rate(i), i=1, . . . ,N, that represents the "guaranteed throughput" or contracted admission rate for class 'i'. Tokens are sent to bank 'i' at rate(i). Tokens that find a full bank are sent to the spare bank. When the spare bank is also full, the token is lost. Every admitted arrival consumes a token. A class 'i' arrival looks first for a token at bank 'i'. If bank 'i' is empty, it looks for a token at the spare bank. If the latter is also empty, the arrival is blocked.

28 Claims, 7 Drawing Sheets

EFFICIENT, RATE-BASE MULTICLASS ACCESS CONTROL

TECHNICAL FIELD

This invention relates to apparatus and a method of allowing multiple classes of users to fairly and efficiently access a limited common resource.

BACKGROUND OF THE INVENTION

Various techniques have been proposed to provide a mechanism to fairly and efficiently allocate a common resource to multiclass traffic having stochastic (non-deterministic) arrival processes whose variability precludes deterministic scheduling. For each technique, the aim is to provide a fair mechanism in which each class is guaranteed a certain throughput, independent of the demand coming from the other classes. The technique must also be efficient, in that capacity is fully utilized whenever there is demand for it, and be capable of operating in an "open loop" configuration in which the access control mechanism does not receive status information from the shared resource.

For example, consider a telecommunications network that can handle a limited number of packetized communications messages. The network receives packet traffic from numerous customers having communications and business needs that differ from each other and that change with time. The customers are willing to contract for different levels of minimum use of the network, which must be guaranteed by the network provider. Both the network provider and the customers would like to use any excess network capacity for traffic demands made by users that exceed the contracted minimum. Once packets are accepted into the network, they must be transmitted to their destinations; no feedback is available to the admission control mechanism regarding the network status.

In the foregoing scenario, the demand posed on the network varies in some random fashion, since the customers originate traffic independently of each other. This inherent randomness gives rise to a conflict between the desire to run an efficient network operation, and the need to guarantee every customer is contracted network access as well as a fair share of any excess capacity in the network. The same problem exists in other telecommunications and in data processing environments: a pool of telephone agents, bandwidth in a communication channel, and processing time in a CPU, are examples of limited resources facing access requests from plural sources.

One common strategy that is known in the prior art is to partition the entire resource into designated shares for each class. Obviously, this approach has the positive quality of preventing one class from interfering with another; however, it also has the negative quality of inefficient utilization of the resources, in that it fails to allocate idle resources. The logical complement to complete partitioning is complete sharing, which yields efficient utilization of the resource but not protection of one class from another, since it does not guarantee each class its fair share.

Another approach to access control that may attain positive qualities of partitioning and sharing is based on the notion that each class may have a portion of the resource dedicated (reserved) for it, but the sum of all of the capacity reservations are less than the total capacity. The unreserved capacity is then shared on a first-come, first-served basis. Unfortunately, such a control scheme has a limited efficiency, since unused resources can be wasted. Also, the system parameters need to be tuned to the specific arrival processes. In contrast, what is desired is an admission control technique that requires no feedback information, and that can accommodate a very wide range of arrival processes.

Another access regulation mechanism, provided as part of a new service originated by Bell Communications Research, Inc. called Switched Multi-Megabit Data Service (SMDS), uses a credit bank to keep track of the resources used by a subscriber to be sure that an agreed upon usage limit is not exceeded. However, this policing mechanism is useful only for a single class of traffic, and does not contemplate sharing of excess capacity with multiple other subscribers.

An overload control used in AT&T's #5ESS® switch, known as the "Routing and Terminal Administration" (RTA) throttle, uses a scheme designed for two classes—line originations and trunk originations. While this scheme does have a sharing feature whereby excess capacity from one class can be used by another class, it cannot work for an arbitrary number of classes, and the specific process used for the two classes suffers because it is specifically designed only for certain limited applications.

Yet other approaches are described in several United States patents. Specifically, U.S. Pat. No. 5,014,265 issued May 7, 1991, to Ellen L. Hahne et al. entitled "Method and Apparatus for Congestion Control in a Data Network" describes a method of controlling congestion in a virtual circuit packet network. An initial packet buffer is assigned to each virtual circuit at each node into which incoming packets are stored and later removed for forward routing. If a larger buffer is desired for a virtual circuit to service a larger amount of data, then additional buffer space is dynamically allocated selectively to the virtual circuit on demand if each node has sufficient unallocated buffer space to fill the request. In one embodiment, the criterion for dynamic allocation is based on the amount of data buffered at the data source. In alternative embodiments, the criteria for dynamic allocation may be further based on the amount of data buffered at each node for a virtual circuit and the total amount of free buffer space at each node of a virtual circuit. Signaling protocols are disclosed whereby data sources and virtual circuit nodes maintain consistent information describing the buffer allocations at all times. Because the Hahne approach presumes that the control mechanism has detailed knowledge of the state of the resource being controlled (via the signaling protocol), it is not useful where such knowledge is not available.

Numerous other references exist that describe flow control mechanisms useful in packet networks. Some of these mechanisms are intended to prevent overflow at a receiver buffer, and are not directed to regulation of admission to a shared resource. Other techniques involve flow control methods that try to protect resources by establishing an admission window that depends upon feedback information, and that cannot operate on an open loop basis. Yet other techniques do operate on an open loop (pacing control) basis, but do not satisfy other requirements that are described above. Examples of these references are U.S. Pat. No. 4,984,264 issued to Yasuhiro Katsube on Jan. 8, 1991, which describes a call admission control and cell flow monitoring method, U.S. Pat. No. 4,769,810 issued to Adrian E. Eckberg Jr., entitled "Packet Switching System Arranged for Congestion Control through Bandwidth Management", and U.S. Pat. No. 4,613,359 issued to Michael L. Fontenot and entitled "Adaptive Preferential Flow Control for Packet Switching System".

SUMMARY OF THE INVENTION

In accordance with our invention, a fair and efficient admission scheme enables sharing of a common resource among multiple traffic classes. The approach guarantees (on a suitably long-term basis) to each class a contracted minimum use of the resource, and allows each class to go beyond the contract when extra resource capacity becomes temporarily available. Thus, spare capacity is dynamically redistributed as it becomes available due to inherent traffic variability. The scheme operates in an open loop node, so that the admission mechanism does not require information describing the current status of the resource.

Our approach is best described first for an important, particular formulation, and then for a more general formulation that offers additional flexibility in the dynamic assignment of idle resources across the classes. The following description uses "tokens" and "token banks" in order to help visualize the concept. As will be explained below, a token bank is functionally equivalent to a counter that is incremented by the deposit of a token and decremented by the withdrawal of a token.

In our method, tokens are assigned to each of a plurality of requesters that are requesting access to a shared limited resource at a rate determined by the minimum guaranteed rate associated with said requester. The tokens assigned to each requester are stored in a bank having a finite capacity that is associated with the requester. Tokens assigned to any requester are stored in a common bank also having a finite capacity, if the bank associated with that requester is full. A requester is allowed to gain access to the resource by first using tokens in the requester's associated bank or by then using tokens in the common bank. If there are insufficient tokens in both banks, access to the resource is denied. In this way, allocation to the resource is controlled such that each requester is granted access to the resource at a minimum guaranteed rate associated with the requester and such that the resource may be used by any requester exceeding its minimum guaranteed rate only if the resource is available.

Mathematically, the invention is described as follows: Let the number of classes be N. Our mechanism uses one token bank per class (bank 'i', i=1, ..., N), plus one spare bank (bank 'N+1'). Bank sizes are finite. Class 'i' is preassigned a rate, rate(i), i=1, ..., N, that represents the "guaranteed throughput" or contracted admission rate for class 'i'. Tokens are sent to bank 'i', i=1, ... N at a deterministic rate(i). Tokens that find a full bank are sent to bank 'N+1'. When bank 'N+1' is also full, the token is lost. Every admitted arrival consumes a token. A class 'i' arrival looks first for a token at bank 'i'. If bank 'i' is empty, it looks for a token at bank 'N+1'. If the latter is also empty, the arrival is blocked.

The above-described particular example of our technique guarantees that arrivals from each class can consume resources at a predetermined rate while making unused capacity available to arrivals from all classes. It assumes that the number of tokens required for admission is the same for arrivals from each class, and that excess capacity is shared across the classes in proportion to the rate that arrivals from each class seek to gain admittance using tokens that have overflowed into the spare bank.

In a more general formulation, additional control over the admission scheme may be obtained by requiring arrivals from different classes to use an unequal number of tokens in order to gain admission to the resource. This may be done by appropriately weighing the tokens by a corresponding workload factor. In addition, to enable more control over how excess capacity is shared by individual classes, it is not necessary to constrain the number of banks to be one greater than the number of classes, and arrivals of different classes can check a different number of banks and different sequences of banks in order to gain admission. Lastly, tokens can be sent to all or only a subset of the banks, and tokens arriving at a full bank can then be overflowed to one or more alternative banks in a specified sequence. This would accommodate the possibility, for example, that the spare bank is used as a resource for only a subset of classes, or that different classes are grouped such that admission requests from members of the group are treated differently than are requests from other classes.

While the previous description uses discrete "tokens", it may sometimes be more efficient to implement the invention using an admission price for an arrival, as opposed to an integer number of tokens. Likewise, associated with each class is a continuous flow of credit, as opposed to discrete tokens. Credit associated with class 'i' arrives at rate "rate(i)". Over a time interval T, the amount of credit to arrive associated with class 'i' is rate(i) × T. Advantageously, to minimize processing and information storage requirements associated with the status of the banks, updating of credit in all banks occurs only at the time an arrival from any class is processed, (and thus when a withdrawl request is made from any bank), rather than at periodic intervals or in response to the arrival of tokens or credit.

BRIEF DESCRIPTION OF THE DRAWINGS

In the drawing,

in FIG. 7, six classes are divided into two groups of three classes each, and members of each class operate "cooperatively", while in FIG. 8, four classes are arranged so that class 1 has strict priority over all other classes.

DETAILED DESCRIPTION

Figure 1:
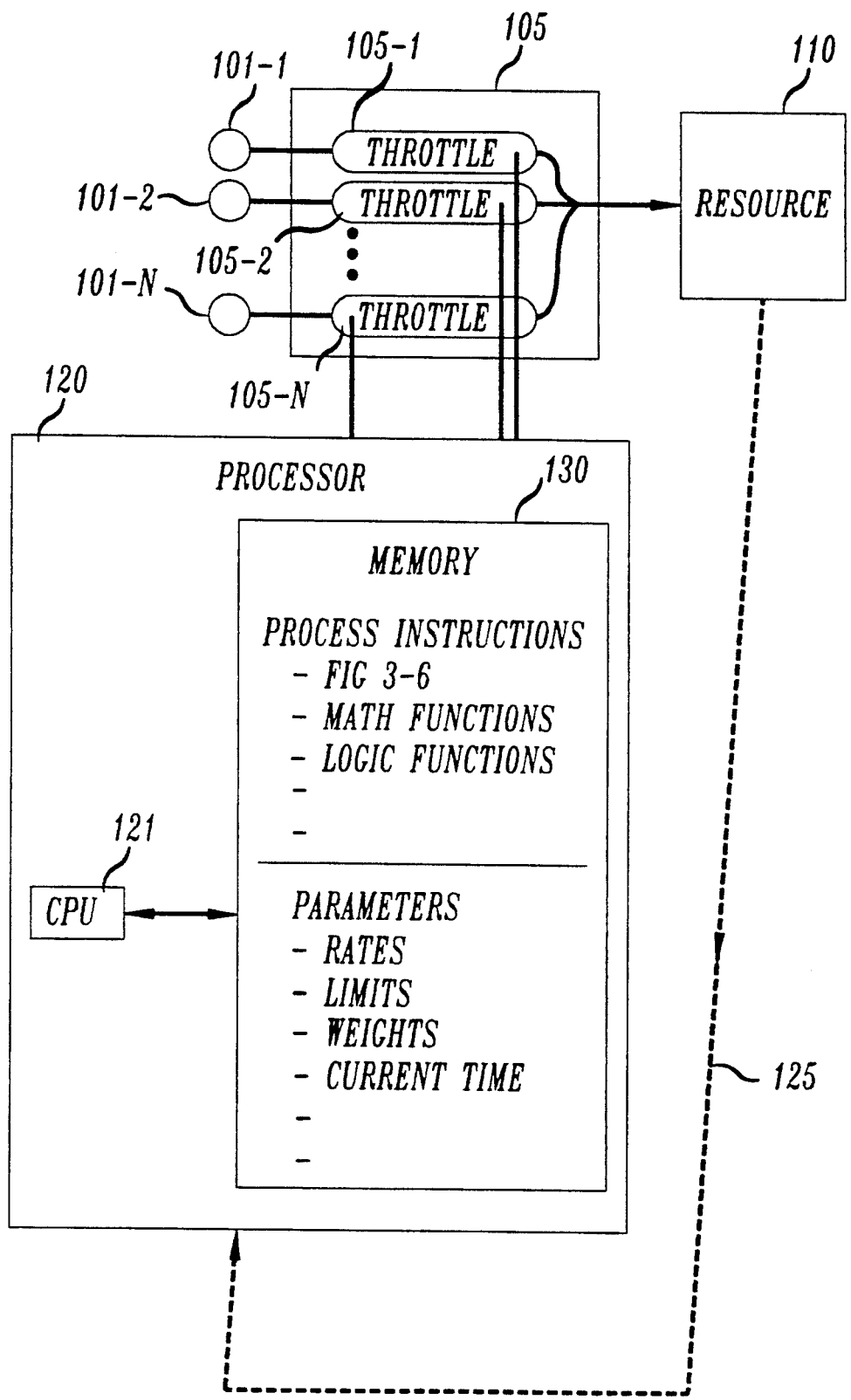
FIG. 1 is a block diagram generally illustrating a multiclass access control arrangement in accordance with the present invention.

Referring first to FIG. 1, there is shown a block diagram generally illustrating a multiclass access control arrangement in accordance with the present invention. In FIG. 1, a total of N classes 101-1 to 101-N are arranged to generate individual requests for access to a resource 110. It is assumed that access requests occur independently of each other in an unpredictable (non-deterministic) manner, all requests, however, seek "admittance" to and service from, the same resource 110, which is limited and therefore cannot handle an unlimited number of requests per unit of time.

For example, classes 101-1 to 101-N may be N call streams, each stream belonging to a different customer and resource 110 may be a telecommunications switching network. Alternatively, the N classes may correspond to N terminal devices, and the common resource may be a shared central processing unit. Other resources for which the present invention may provide an access control mechanism include a pool of attendants, a communication channel, real time processing power, buffer space, etc..

Admission requests (requests for service) from each of the classes 101-1 to 101-N pass through a "throttle" or switch designated generally as 105, which comprises a plurality of N individual throttles 105-1 to 105-N, one for each class. If a throttle is enabled (switch closed), the request received from the associated class is allowed to access resource 110; if a throttle is disabled (switch open), the access request is not allowed through the throttle, but is rather discarded. The status of each throttle 105 is controlled by a processor 120, described below, which generally operates independently (i.e., without knowledge) of the status of resource 110, such that each throttle allows passage of access requests from its associated class at a nominal rate, rate(i), where i is an index variable having a value between 1 and N. Thus, the access control mechanism can be characterized as an "open loop" mechanism. However, in certain situations, it may be possible to occasionally change certain of the parameters that govern the throttles (e.g., change the value of rate(i)) in response to a control signal generated in resource 110 and applied to processor 120 on control line 125.

Processor 120 may include a central processing unit 121 which can perform simple mathematical and logical operations on parameters stored in a memory 130. As shown, memory 130 is also arranged to store instructions for performing sequences of process steps, such as those steps described in conjunction with FIGS. 3-6 below. The parameters stored in memory 130 can include the rates, (rate(i)), at which tokens or credit is supplied to each classes, the limits for storing tokens or credit in banks, the weights associated with tokens or credit that must be used to gain access, and other information needed for performing the process steps of the present invention, such as the current time and the time at which previous updates were made. With the proper arrangement of CPU 121 and stored programs in memory 130, processor 120 may be configured to provide the functionality of a plurality of counters, each of which can serve as one of the token banks mentioned above. Thus, when tokens or credit is added to a bank, the count in a corresponding counter is incremented; when tokens or credit is used (withdrawn from a bank), the count in a counter is decremented. Increments can be thought of as discrete, in the case of tokens, or continuous, in the case of credit.

Figure 3:
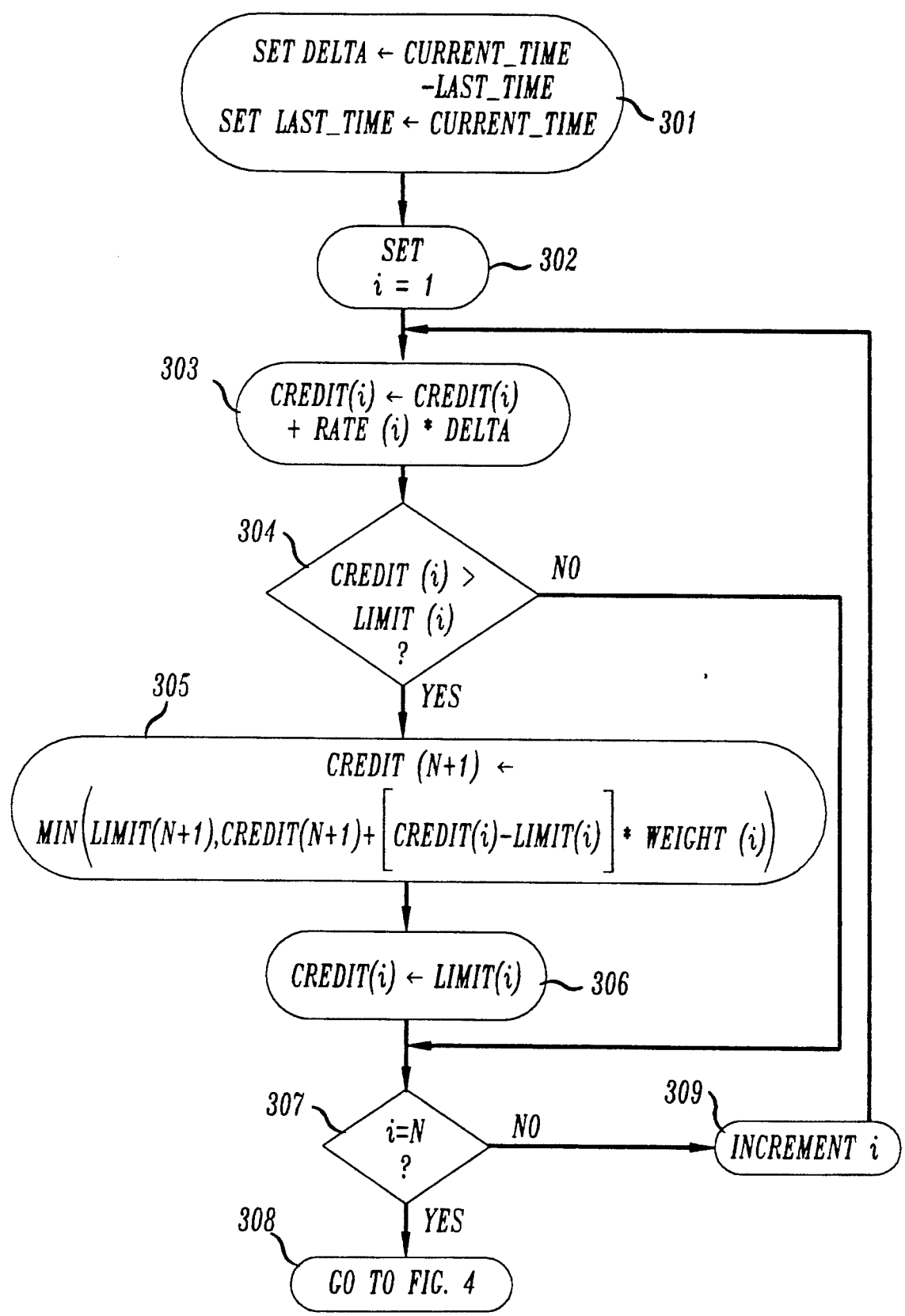
FIGS. 3 and 4 are logic flow diagrams illustrating, for one embodiment of our invention, the steps performed in processor 120 of FIG. 1.
Figure 4:
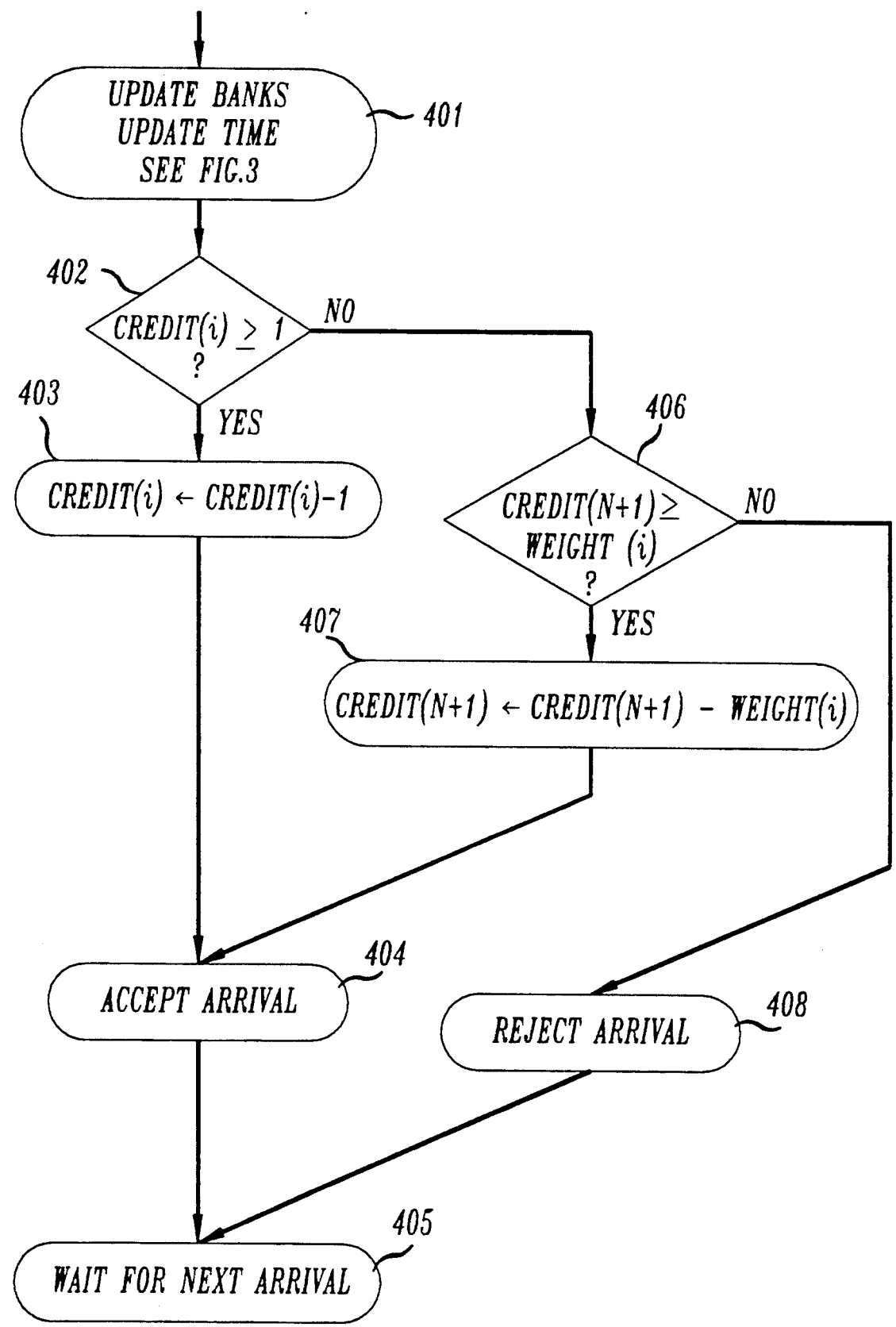

Conceptually, one embodiment of the present invention, which is described below in conjunction with FIGS. 3 and 4, is arranged to use processor 120 to create one token bank, (bank 'i', i=1, ..., N) for each of the N classes requesting access to resource 110, as well as one spare bank (bank 'N+1'). Each token bank is analogous to a counter having a finite size. Each class 'i' is allowed access to resource 110 at a preassigned, nominal rate designated rate(i), which represents the "guaranteed throughput" or contracted admission rate for that class. Accordingly, tokens are sent to bank 'i' at deterministic rate, rate(i). Tokens received by a bank can be thought of as incrementing the count in a counter.

In order to advantageously make use of unused or excess capacity, the present invention is arranged such that tokens sent to a full bank are forwarded to a "spare" or extra bank, bank 'N+1'. However, when token bank 'N+1' is also full, the token is lost. The spare bank can be thought of as storing an indication representing the difference, for all users (classes), between the nominal rate at which the users are permitted to access the resource, and the actual rate at which they have accessed the resource in the "recent" past, i.e., during a selected time period. This time period is "selected" by virtue of the sizes assigned to individual banks.

Throttles 105-1 to 105-N are arranged so that each request for access requires a token in order for the throttle to be enabled or closed. Every admitted arrival consumes a token, which can be thought of as decrementing the count in a counter. A class 'i' arrival looks first for a token in its own token bank, bank 'i'. If that token bank is empty, it then looks for a token in the spare token bank, bank 'N+1'. If the latter contains a token, the throttle is enabled (closed); if it is also empty, the throttle is disabled (opened) and access to resource 110 is blocked.

Figure 2:
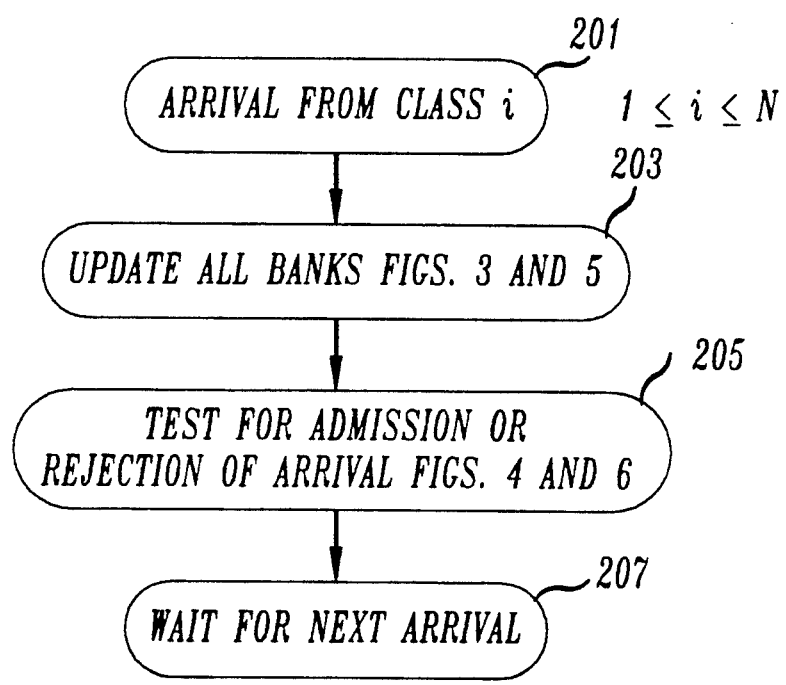
FIG. 2 illustrates the overall process performed in processor 120 both for the specific embodiment of our invention described in FIGS. 3 and 4 as well as for the more generalized version of our invention described in FIGS. 5 and 6.
Figure 5:
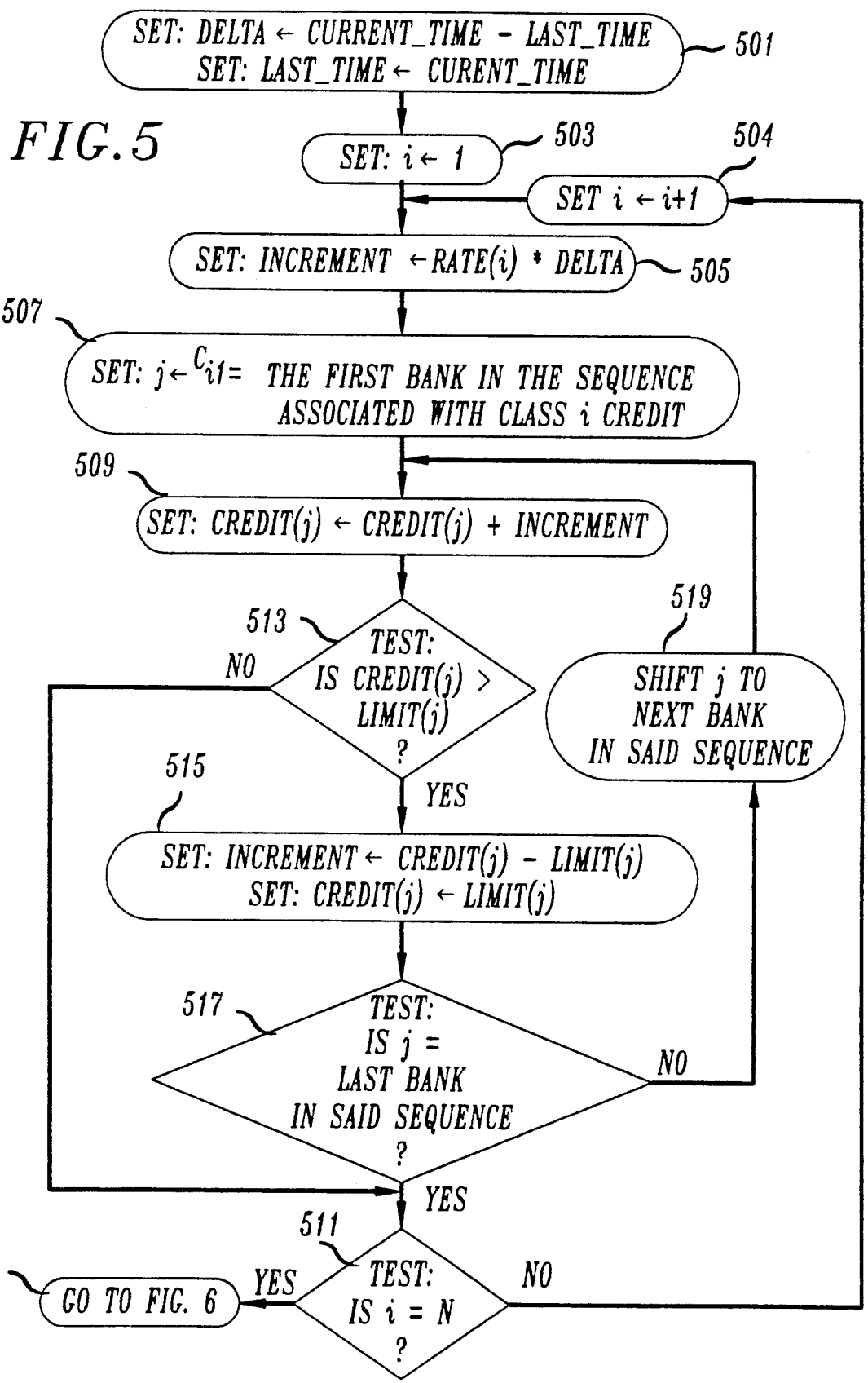
FIGS. 5 and 6 are logic flow diagrams illustrating another, more general embodiment of our invention.
Figure 6:
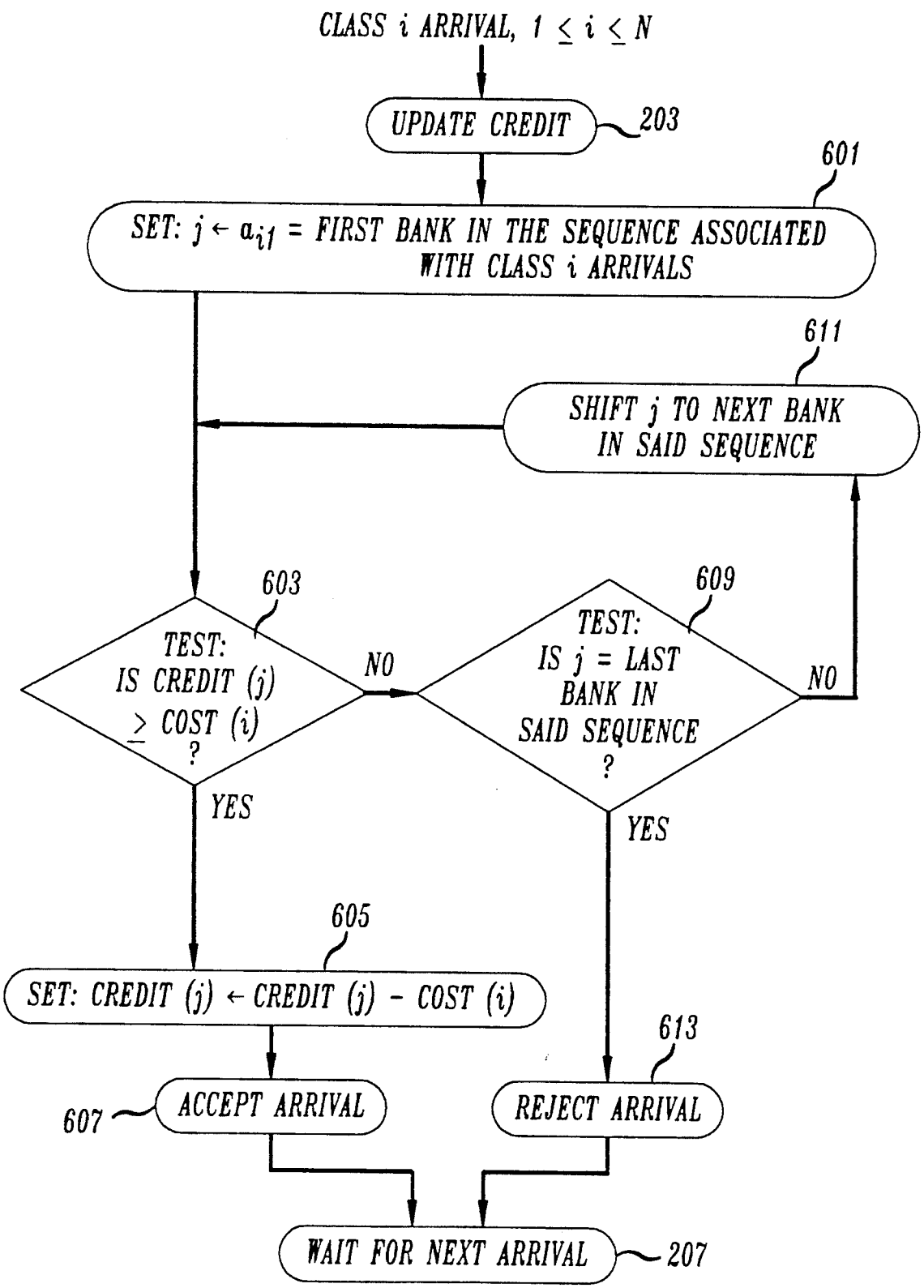

FIG. 2 illustrates the overall process performed in processor 120 both for the specific embodiment of our invention described in FIGS. 3 and 4 as well as for the more generalized version of our invention described in FIGS. 5 and 6. The process is initiated, in step 201, by an arrival from any class i, where $1 < i < N$, which seeks admission to a common resource. In response to any such request, banks are updated in step 203, to add credit that accrued since the last update. This process is described in more detail in FIGS. 3 and 5. Next, in step 205, a determination is made to admit or reject the arrival, using the processes detailed in FIGS. 4 or 6. Finally, the process then awaits the next arrival in step 207, whereupon the entire process is repeated.

For one embodiment of the access control mechanism in accordance with our invention, the steps performed in processor 120 are illustrated, in the form of logic flow diagrams, in FIGS. 3 and 4. Referring first to FIG. 3, there is shown a detailed flow diagram for the process in step 203 of FIG. 2 by which the time variable and token banks (bank 'i', i=1..., N+1) are updated. Initially, in step 301, a first variable designated "DELTA" is computed as the time difference between the variable "current_time" and a second variable known as "last_time". The latter indicates the time at which step 301 was last performed. Concurrently, the value of "last_time" is updated to be the current time, so that when step 301 is again repeated, "DELTA" will again accurately reflect the elapsed time between successive instances in which step 301 is performed.

In step 302, an indexing variable i, which can have a value between 1 and N, is initialized by being set to 1. Next, in step 303, the contents in the $i^{th}$ token bank associated with class 'i' are updated by adding the value of the appropriate number of tokens, calculated by forming the product of the rate, rate(i) at which tokens for this class are accumulated and the time interval "DELTA" since the last update. If it is determined, in step 304 that the content of $i^{th}$ token bank has not reached its limit (given by limit(i) ), a test is made in step 307 to determine if i=N, indicating that credit for all N classes has been accounted for. If a negative result is obtained, other classes must also be processed. In this case, the value of 'i' is incremented in step 309, and the process repeated beginning at step 303 for the next class in the sequence. If a positive result is obtained in step 307, all token banks have been updated and the process of FIG. 3 is terminated in step 308.

In the event that step 304 produces a positive result, indicating that the $i^{th}$ token bank has exceeded limit(i), the excess "credit" is transferred to shared token bank 'N+1' in step 305, provided that this bank is not also above its limit, given by limit(N+1). This is done by forming the product of the value of the excess, i.e., the difference between the value in bank 'i' after updating and the limit for that bank (i.e., limit (i)) and the weight assigned to the $i^{th}$ class (i.e., weight(i)), and adding the product to the then current contents of bank 'N+1', as long as the value in bank 'N+1' does not exceed limit (N+1). In addition, in step 306, the value stored in bank 'i', which had been above its limit, is now reduced to the limiting value, limit(i). Thereafter, step 307 is performed, as described above.

FIG. 4 illustrates in the form of a flow diagram, the process used for each request for admission to access a shared resource. In response to receipt of a class 'i' arrival, in step 401, all of the token banks (bank 'i', i=1 ..., N+1) are updated and a "time" varible is updated or reset. This step is described in detail above, in connection with FIG. 3.

Next, in step 402, the particular token bank (bank 'i') corresponding to the particular class (class 'i') seeking admission is checked to see if its contents, denominated credit(i), are greater than or equal to the value of one token. If a positive result occurs in step 402, the contents of the token bank are decremented by the value of one token in step 403, and the corresponding throttle 105 is enabled to accept the admission request and allow access to resource 110 in step 404. The process then waits for the arrival of the next admission request in step 405, whereupon the process of FIG. 4 is repeated.

If the result of step 402 is negative, so that the particular token bank (bank 'i') serving the requesting class is empty, the contents of the spare bank (bank 'N+1') are checked in step 406. Here, however, a determination is made to see if its contents are greater than or equal to a weighting value, weight(i). The weighted value is used to handle class dependent workload per arrival. Note, however, that the value of weight(i) may be unity. If a positive result occurs in step 406, the contents of the spare token bank are decremented by the weighting value, weight(i) in step 407. Access is then granted in step 404, and the process awaits the next arrival in step 405. If the content of the spare token bank is less than weight(i), the request for access is rejected in step 408, and the process proceeds to step 405, to await the next arrival.

The embodiment of the present invention described in conjunction with FIGS. 3 and 4 can be generalized, in the manner illustrated in FIGS. 5 and 6, in order to attain greater control of the admission process. In the more general approach, a one to one correspondence between a class and a given (dedicated) token bank is not required. Rather, the number of banks can be greater than, equal to, or less than the number of classes. In addition, (a) the sequence in which an arrival of a given class checks a subset (or all) of the banks, and (b) the sequence in which credit is entered into the banks, may be different for different classes. Instead of requiring an integral number of tokens for admission, the generalized approach deducts a "price" from the bank each time the common resource is accessed or used.

In this embodiment, the following definitions are used:

N is the number of classes, as before;

M is the number of banks; M can be larger than, equal to, or smaller than N;

rate(i) is the deterministic rate at which credit associated with class 'i' arrives, where i=1, 2, ... N; or, stated slightly differently, rate(i) is the deterministic rate of arrival (the flow rate) of credit associated with class i. Note that for some i, rate(i) may be zero;

limit(i) is the capacity of bank 'i';

credit(i) is the amount of credit currently in bank 'i';

cost(i) is the amount of credit needed by an arrival from class 'i' to be admitted to the common resource; stated differently, cost(i) is the price of admission for class 'i';

n(i) is the number of banks in a sequence $a_{i1}, a_{i2}, a_{i3}, \ldots a_{in(i)}$ of banks checked by arrivals from class i, where $a_{ij} \in \{1, \ldots, M\}$ for all i=1,2, ..., N and j=1, 2, ..., n(i). For example, for M=10 and n(i)=3, a possible sequence is: $(a_{i1}, a_{i2}, a_{i3}) = (6,10,1)$. Note, N(i) may be as small as 1.

m(i) is the number of banks in a sequence $c_{i1}, c_{i2}, c_{i3}, \ldots c_{im(i)}$. Such a sequence determines the priorities according to which credit associated with class i is allocated. Note that the credit associated with class i need not necessarily flow first to bank i; that is, $c_{i1}$ need not be i, but rather may be any bank.

Referring now to FIG. 5, the process (step 203 in FIG. 2) by which the credit in each of the M banks is updated is illustrated. As noted above, the process is triggered by an arrival from any class, i.e., by step 201 in FIG. 2.

Initially, in step 501, a first variable "DELTA" is set as the difference between a variable "current_time" and a variable "last_time", and the value of "last_time" is updated to the current time. Next, in step 503, the value of index 'i' is initialized at 1.

The amount of credit earned by class 'i' is demoninated "increment", and computed in step 505 by forming the product of rate(i) associated with class i and the value of "DELTA" computed in step 501. Then, in step 507, a variable designated 'j', which is useful for conceptual purposes in explaining the invention, is set equal to $c_{i1}$, which is the first bank in the sequence of banks that class 'i' credit flows to. Setting 'j' to $c_{i1}$ may be accomplished in processor 120 by a simple table lookup operation.

In step 509, the credit stored in bank 'j', i.e., the first bank in the sequence, is increased by an amount given by the value of "increment" determined in step 505, and a test is made in step 513 to see if bank 'j', with this increment, exceeds its associated limit, limit(j). If not, the increment is allowed to remain in that bank, and the process jumps to step 511. If the limit has been exceeded, the excess is removed from the bank in step 515, and the credit stored in the bank is set to precisely limit(j). In the same step, the unused portion of the increment (i.e., the amount by which the updated credit in the bank had exceeded its limit) is computed, and the value of the variable "increment" is updated. This is done so that this credit can be stored in the next bank in the sequence that is not full, if any.

In step 517, a determination is made as to whether or not bank 'j' is the last bank in the sequence of banks to be updated. If not, the value of is repeated with respect to that bank. On the other hand, if it is determined in step 517 that all banks in the sequence have been checked, the process continues with step 511, in which it is determined if the credit to arrive for all of the classes has been accounted for, i.e., if i=N. If not, the value of 'i' is incremented in step 504, and the update process is repeated for the next class beginning at step 505. If the credit from all classes have been updated, the process of FIG. 5 is terminated in step 523.

After the updating process (step 203 of FIG. 2) is completed, the admission/rejection decision for each arrival (step 205 in FIG. 2) is made, as illustrated in detail in FIG. 6. Initially, in step 601, the identity (number) of the first bank $a_{i1}$ in the sequence of banks to be checked for credit, is determined, again by using a table lookup within processor 120. For ease of description, this bank is referred to as bank 'j'. The credit stored in bank 'j' is tested in step 603, to see if it equals or exceeds cost(i), the "price" necessary to gain admittance to the resource for a class 'i' arrival. If a positive result is obtained, the balance in bank 'j' is updated in step 605 by deducting the price, i.e., cost(i). The arrival is admitted in step 607, and the process then awaits the next arrival in step 207 of FIG. 2.

On the other hand, if bank 'j' has insufficient credit as determined in step 603, a test is made in step 609 to determine if bank 'j' is the last bank in the sequence of banks from which an arrival in class 'i' may obtain credit. If so, the arrival is rejected in step 613, and the process then awaits the next arrival in step 207 of FIG. 2. If other banks can still be checked, the value of 'j' is incremented in step 611, and the process continued by repeating step 603.

Inspection of FIGS. 5 and 6 will reveal that the generalized process shown therein is equivalent to the specific process illustrated in FIGS. 2 and 3 when: the number of banks is one greater than the number of classes, i.e., M=N+1; the sequence for adding class 'i' credit to the banks is (i, N+1); and the sequence for checking banks for credit with respect to arrivals from class 'i' is also (i, N+1).

In the description given above for FIGS. 5 and 6, it is to be noted that several assumptions, which may be altered if desired, have been made with respect to overflows. First, in the event that an "increment" of credit cannot entirely fit into a bank, a choice can be made such that (1) none of the credit enters the bank and it all overflows to the next bank in the sequence that has sufficient room, or (2) that the increment is divided such that part enters the bank in order to fill it, and the remainder overflows to the next bank in the sequence. The second alternative was depicted in FIG. 5.

Second, in the event that an arrival has a cost that is greater than the credit available in a given bank, a choice can be made such that (1) no credit is taken from the bank and the full cost is taken from the next bank having at least the needed amount of credit, or (2) the bank is emptied of credit and a reduced cost is sought from the bank in the sequence. The first alternative was depicted in FIG. 6.

Figure 7:
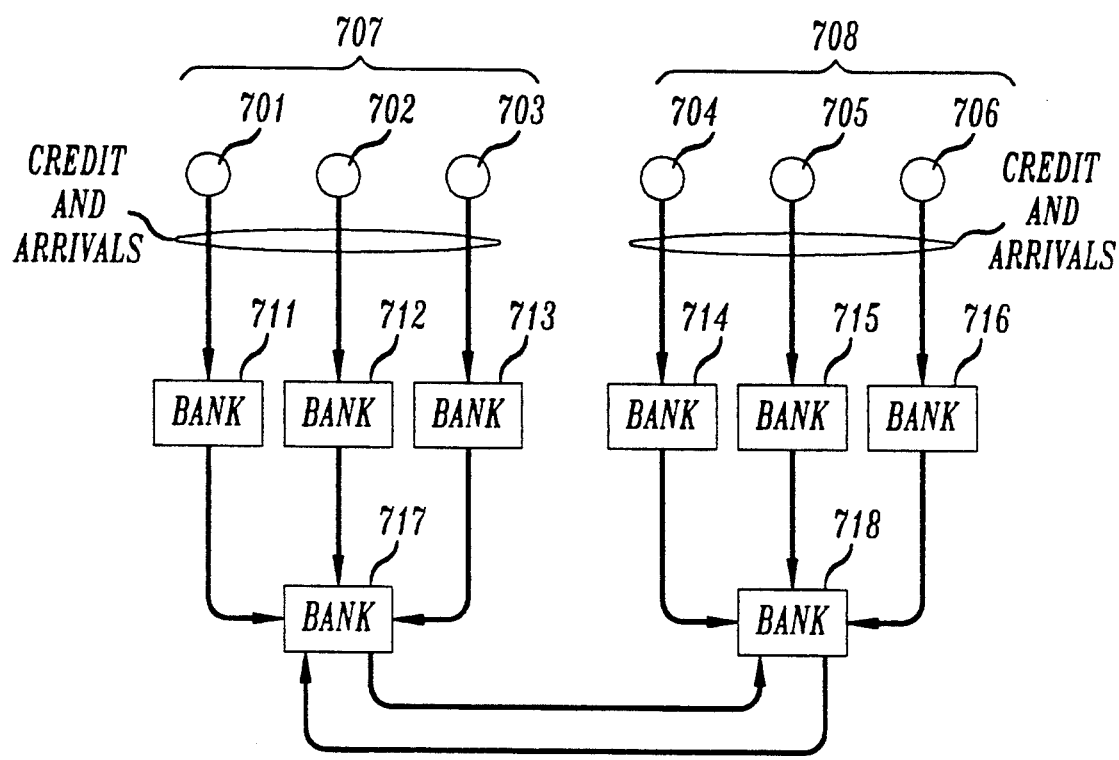
FIGS. 7 and 8 illustrate examples of the access control process described in FIGS. 5 and 6.

Several examples will illustrate the processes described in FIGS. 5 and 6. First, as shown in FIG. 7, consider N=6 classes of users 701-706 partitioned into two groups 707, 708 of three each, such that users in each group desire to share excess capacity among themselves before sharing it with users in the other group, and to use capacity from their own group before seeking credit from the other group. In this event, a total of M=8 banks 711-718 is established, such that credit for classes 701-706 is initially directed to banks 711-716 respectively, and such that credit for group 707 (classes 701-703) overflows to first to bank 717 and then to bank 718, while credit for group 708 (classes 704-706) overflows to first to bank 718 and then to bank 717. The same sequence is used for arrivals from each class 701-706 as is used for the associated flow of credit: credit for arrivals in classes 701-706 is initially sought from banks 711-716 respectively. If banks for arrivals from members is group 707 (classes 701-703) do not have sufficient credit available, credit is then sought first from bank 717 and then from bank 718. Credit for arrivals from members of group 708 (classes 704-706) that is not available after an initial attempt is sought then from bank 718 and lastly from bank 717.

Figure 8:
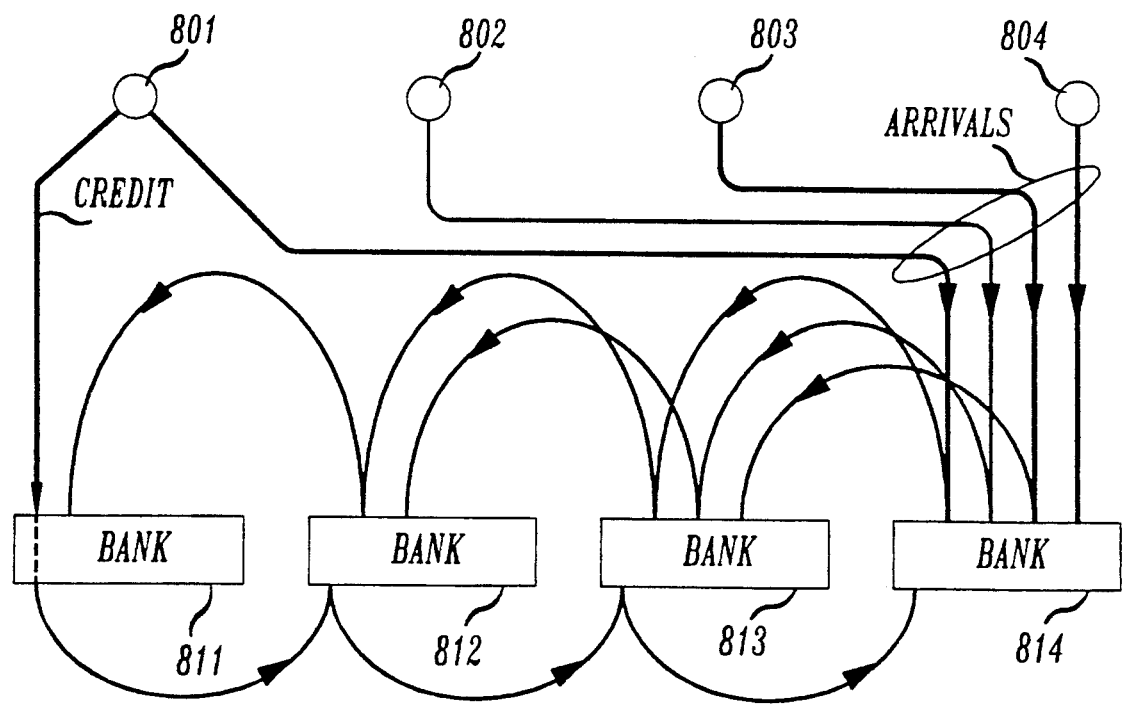

In this example, with respect to arrivals for classes i=701,702,703: $(a_{i1}, a_{i2}, a_{i3}) = (i+10, 717, 718)$, while for classes i=704,705,706, $(a_{i1}, a_{i2}, a_{i3}) = (i+10, 718, 717)$ With respect to credits for classes i=701,702,703: $(c_{i1}, c_{i2}, c_{i3}) = (i+10, 717, 718)$, while for classes i=704,705,706, $(c_{i1}, c_{i2}, c_{i3}) = (i+10, 718, 717)$ Another example, in which strict priority treatment is afforded across four classes, is illustrated in FIG. 8. In this figure, class 801 has highest priority, class 802 next highest, and classes 803 and 804 have yet decreasing priorities. To attain strict priority, M=4 banks 811-814, are used, and only class 801 has a (positive) flow of credit associated with it: rate(802)=rate(803)=rate(804)=0. Class 801 credit flows first to bank 811, then overflows to banks 812, 813, 814 in the stated order. Thus, with respect to credit for class 801: $(c_{11}, c_{12}, c_{13}, c_{14}) = (811,812,813,814)$. For arrivals from class 801: $(a_{11}, a_{12}, a_{13}, a_{14}) = (814,813,812,811)$; For arrivals from class 802: $(a_{21}, a_{22}, a_{23}) = (814,813,812)$; For arrivals from class 803: $(a_{31}, a_{32}) = (814,813)$; For arrivals from class 804: $(a_{41}) = (814)$.

It is worthwhile, at this point, to reiterate certain potential applications of the present invention. Consider a big telemarketing operation with a large (but not unlimited) number of telephone attendants. The telemarketing operator provides services to a number of customers who contract for a specified (minimum) load, perhaps based upon their experience and economic factors. However, the load generated by each customer, in terms of calls to the telemarketing center, is not totally predictable, since callers act independently of each other. The present invention guarantees that the contractual (desired minimum) load of each customer be handled by the attendants at all times. Therefore, each customer is protected from the possibility that their business will suffer due to unexpected excessive arrival rates of other customers. Moreover, load in excess of the contractual level is also allowed to access the pool of telephone attendants, provided that the demand arrives when there is extra capacity in the telemarketing system, due to low demand from other customers.

The present invention can also prove useful in connection with broadband ISDN. In this environment, messages belonging to many users are transmitted using the Asynchronous Transfer Mode (ATM) protocol. In one application, a corporation requests from a network provider a virtual path connection (VPC) between two corporate locations. Individual end users at the locations then establish virtual channel connections (VCCs) that collectively are constrained to be within the traffic parameters negotiated for the VPC from the network. Equipment owned by the corporation could use the invention to equitably and efficiently share the capacity of the VPC across the different VCCs. Likewise, the network could provide this functionality as a service to the customer. In another application, requests for VCCs from unassociated end users, who happen to require the same source and destination network nodes, can be bundled into a common VPC. The network then can use the invention to provide enhanced performance to the customers of the VCCs. Another closely related application is for VCCs that pass through multiple networks. A network serving as an interconnect between other networks could, in analogy to the previous application, use the invention on bundles of VCCs that share a common path.

Another potential application of the present invention involves overload controls for telecommunications switches, such as AT&T's #5ESS electronic switch. In this connection, the throttle described above may be arranged to work with multiple classes of calls originating from separate sources and competing for processing within the switch. The classes have different requirements, such as real-time, call-setup processing requirements.

Persons skilled in the art will realize that the present invention may be modified in various ways, without departing from the spirit and scope of the following claims. For example, while the present invention is described in terms of tokens, credits, costs and banks, persons knowledgeable in the art will recognize that an analogous description can be made in terms of leaks and buckets. This alternative description takes the complementary view: arrivals deposit a quantum of "liquid" in finite counters called buckets, and buckets are "drained" at fixed rates. (Deposits are counter increments and drains are counter decrements.) The leaky-bucket concept for a single arrival class is well known: arrivals are admitted while there is enough space in the bucket, and the latter is drained at a constant rate.

In order to describe the first embodiment of the invention in the leaky-bucket phraseology, we provision a bucket per class, plus an additional spare bucket. Bucket 'i', $i = \{1, 2, \ldots N\}$, is drained at a rate given by rate(i). When bucket 'i' is empty, the drainpipe is moved to spare bucket 'N+1'. The drainpipe returns to its original bucket as soon as an arrival deposits liquid in the empty bucket. Note that multiple drainpipes may simultaneously be draining liquid from bucket 'N+1'. Requests have to deposit a fixed quantum of liquid to be admitted to the system. Class 'i' requests first look for space in bucket 'i'. Should not enough space be available, it will look for the extra needed space in the spare bucket 'N+1'. If the combined space in both buckets is not enough to accept the liquid, the arrival is blocked.

The more generalized embodiment of our invention can also be recast in this, slightly awkward, leaky-bucket jargon. In this instance, there are two sequences per class: the first sequence determines the order in which the drainpipe moves when the previous bucket is empty; the second sequence specifies the order in which the arrival seeks space to deposit its liquid in a bucket. These two sequences are analogous to the sequences for storing credit and for using stored credit in the above description of FIGS. 5 and 6.

We claim:

1. A method for allocating access to a shared limited resource by a plurality of requesters requesting access to said shared limited resource, said allocation being made such that each requester in said plurality of requesters is granted access to said shared limited resource at a minimum guaranteed rate associated with said each requester and such that said shared limited resource is available for use by any requester exceeding its minimum guaranteed rate only if said shared limited resource is available, said method comprising the steps of:

assigning tokens to said each requester at a rate determined by the minimum guaranteed rate associated with said each requester;

storing tokens assigned to said each requester in a bank associated with said each requester, said bank having a finite capacity;

storing tokens assigned to said each requester in a common bank if said bank associated with said each requester is full; and allowing said each requester to gain access to said shared limited resource by first using tokens in said each requester's bank or by then using tokens in said common bank, and otherwise denying access to said shared limited resource.

2. A method for fair and efficient allocation among competing classes of users of access to a common resource, comprising the steps of (a) establishing an incrementable counter for each class of users, said incrementable counter having a count:

(b) incrementing the count in the counter established for each class of users at a rate associated with said each class of users if said count is below a predefined maximum;

(c) permitting a class of users to access said common resource if the count in the counter established for said each class of users is non-zero;

(d) decrementing the count in the counter established for each class of users upon each use of said common resource by said each class of users;

(e) incrementing the count in a common counter if the count in any counter incremented in step (b) is at said predefined maximum;

(f) permitting a class of users to access said common resource even if the count in the counter established for said class of users is zero, provided that the count in said common counter is non-zero; and (g) decrementing the count in said common counter if access is permitted in step (f).

3. A method for sharing access to a common resource among N users, where N is an integer greater than 1, comprising the steps of assigning a rate, rate 'i', to each of said N users, said rate indicating the minimum desired access for the $i^{th}$ user, where $1 \leq i \leq N$;

storing indicia of the eligibility of the $i^{th}$ user to access said common resource in an associated token bank, bank 'i';

incrementing the indicia in bank 'i' at the rate, rate 'i' up to a predetermined limit, limit 'i';

establishing a common token bank, bank 'N+1', said common token bank having a predetermined limit 'N+1';

incrementing the indicia in bank 'N+1' in the event that any token bank 'i' is at its associated limit, limit 'i', and said common token bank is not at limit 'N+1';

allowing the $i^{th}$ user to access said common resource if either bank 'i' or bank 'N+1' is not empty; and decrementing the indicia in bank 'i' or bank 'N+1' upon granting of access to said common resource.

4. A method of sharing admission to a resource by a plurality of competing users on a fair and efficient basis, comprising the steps of:

allocating a nominal allowable admission rate to each of said competing users;

storing indicia of actual admissions to said resource by each of said competing users;

admitting, in response to said stored indicia, any of said competing users that have been admitted to said resource at less than their nominal rate, storing an indication representing a difference, over a selected time period, for all of said competing users, said difference being the difference between the nominal and actual admissions to said resource; and admitting any of said competing users that have exceeded their nominal rate if said stored indication representing said difference is positive.

5. A method for admitting an integer number N of classes of users to a common resource on a fair and efficient basis, where N>1, comprising the steps of:

establishing a plurality of token banks, including one token bank for each of said N classes of users, each of said banks designated as bank 'i', 'i'=1..., N, plus one spare token bank, bank 'N+1', each of each of said token banks having a finite size;

assigning a rate, rate 'i', i=1, ..., N to each class i, rate 'i' representing the allocated admission rate for class i;

sending tokens to bank 'i' at rate 'i';

sending tokens that find a full token bank to said spare token bank;

discarding tokens sent to said spare token bank when said spare token bank is also full;

for each class i arrival, first using a token from bank 'i' in order to admit said class i arrival to access said common resource;

if bank 'i' is empty, then using a token from said spare token bank in order to admit said class i arrival to access said common resource; and blocking admission to said common resource if said spare token bank is also empty.

6. A method for allocating access to a shared limited resource by a plurality of N requesters requesting access to said shared limited resource, said allocation being made such that each requester is granted access to said shared limited resource at a minimum guaranteed rate associated with said each requester and such that said shared limited resource is available for use by other requesters exceeding their minimum guaranteed rate only if some requesters have not used their entire allocation in the recent past, said method comprising the steps of:

assigning credit to said each requester at said minimum guaranteed rate associated with said each requester;

associating with said each requester, a first sequence of banks selected from a set of M banks for storing credit assigned to said each requester, each of said M banks having a finite capacity, where M and N are integers greater than 1;

storing credit assigned to said each requester in the first bank in that requester's said first sequence of banks that is below its said capacity, or discarding said credit if none of said banks in said each requester's said first sequence of banks is below said capacity;

associating with said each requester, a second sequence of banks selected from said set of M banks for using credit stored in said plurality of M banks; and allowing a requester to gain access to said shared limited resource by withdrawing credit available in the first non-empty bank in said each requester's said second sequence of banks, and otherwise denying access to said shared limited resource.

7. A method for allocating access to a common resource, among N competing classes of users, comprising the steps of:

(a) establishing M incrementable counters each having a predefined maximum, M and N being integers greater than 1;

(b) for each of said classes of users, establishing a rate at which, and a first sequence in which, ones of said M incrementable counters are incremented;

(c) for each of said classes of users, incrementing the count in the first one of said counters in said first sequence that has a count that is below said predefined maximum;

(d) for each of said classes of users, establishing a second sequence in which ones of said M counters are decremented;

(e) allocating access to said resource to any of said classes of users if the count in any of the counters in said second sequence established for said any of said classes of users is non-zero;

(f) decrementing the count in the first one of said counters in said second sequence that has a non-zero count, upon each use of said common resource by said any of said classes of users; and (g) denying access to said common resource to said any of said classes of users if the count in all of the counters in said second sequence is zero.

8. A method for sharing access to a common resource among N users, comprising the steps of assigning a rate, rate 'i', to each of said N users, said rate indicating the minimum desired access for the $i^{th}$ user, where N is an integer greater than 1 and where $1 \leq i \leq N$;

storing indicia of the eligibility of any user to access said common resource in a series of M banks, each of said M banks having a predetermined limit, limit 'j', where M is an integer greater than 1 and where $1 \leq j \leq M$;

for the $i^{th}$ user, incrementing the indicia in said M banks at rate 'i', up to respective limits, said M banks being incremented in a first sequence associated with said $i^{th}$ user, the increment being discarded if all of said banks in said first sequence are at said limit;

allowing the $i^{th}$ user to access said common resource if any bank in a second sequence of banks associated with said $i^{th}$ user is not empty; and decrementing the indicia in the first bank in said second sequence that contains any indicia, upon granting of access to said common resource.

9. A method for admitting users in N classes to a common resource on a fair and efficient basis, comprising the steps of:

establishing M banks, where M and N are integers greater than 1;

establishing, for each of said N classes, a rate at which said class earns credit required to admit said class to said common resource;

establishing first and second sequences for each of said N classes, said first sequence indicating the order in which credit earned by said class is deposited in said M banks, and said second sequence indicating the order in which credit required by said class is withdrawn from said M banks;

for each of said N classes, depositing credit earned at said rate established for said class, in said M banks in accordance with said first sequence, and discarding credit when all banks in said first sequence are full;

admitting users in each of said N classes to said common resource by withdrawing credit from said M banks in accordance with said second sequence, and blocking admission to said common resource to a user in a class if all banks in said second sequence are empty.

10. The method defined in claim 9 wherein $M = N + 1$, and wherein said first and second sequences are the same.

11. A method of regulating access of multiclass arrivals to a common resource, comprising the steps of:

(1) storing credit earned by each class in a plurality of M banks each having a finite credit limit, where M is an integer greater than 1, wherein said storing step includes:

(a) assigning a rate at which each class earns credit;
(b) establishing a first sequence in which credit for each class is stored in said M banks; (c) depositing credit in the first bank in said first sequence that has not exceeded its credit limit; (d) discarding credit if all banks in said first sequence have exceeded their credit limit; and (2) regulating access to said common resource by arrivals from each class, wherein said regulating step includes:

(a) establishing a second sequence in which arrivals from each class seek to use credit stored in said M banks; (b) allowing an arrival to access said common resource by withdrawing credit in the first bank in said second sequence that has credit available; (c) denying access to said common resource if no banks in said second sequence contain credit that can be withdrawn in step (2(b) above.

12. A method of controlling admission of arrivals from users in N classes seeking access to a common resource, each of said users having an associated rate at which access to said common resource is guaranteed, comprising the steps of:

in response to an arrival from a user in any of said N classes, updating the credit in each of a plurality of M banks in accordance with the rate associated with each of said users, where M and N are integers greater than 1, determining if said arrival is admitted to use said common resource or rejected; and awaiting the next arrival, wherein said updating step includes:

(a) for the first class, determining the amount of credit earned since the last update;

(b) adding the amount determined in (a) to the contents of the first bank in the sequence of banks associated with the first class;

(c) determining if the bank is above its limit;

(d) if so, setting the contents of the bank at its limit and adding the excess credit to the next bank in the sequence;

(e) repeating steps (a) to (d) for the remaining classes; and wherein said determining step includes:

(f) in response to an arrival from a user in any of said N classes, determining if the first bank in the sequence associated with said user contains sufficient credit required to permit said arrival to access said common resource;

(g) if a positive result is determined in step (f), allowing access to said common resource by said arrival by withdrawing credit from said bank; and (h) if a negative result is determined in step (f), repeating step (f) with respect to the next bank in the sequence associated with said user.

13. Apparatus for allocating access to a shared limited resource by a plurality of requesters requesting access to said shared limited resource, said allocation being made such that each requester is granted access to said shared limited resource at a minimum guaranteed rate associated with said each requester and such that said shared limited resource is available for use by any requester exceeding its minimum guaranteed rate only if said shared limited resource is available, said apparatus comprising:

means for assigning tokens to said each requester at a rate determined by the minimum guaranteed rate associated with said each requester;

storing means for (a) storing tokens assigned to said each requester in a bank associated with said each requester, said bank having a finite capacity, and for (b) storing tokens assigned to any requester in a common bank if the bank associated with said each requester is full; and means for allowing a requester to gain access to said shared limited resource by first using tokens in said each requester's bank or by then using tokens in said common bank, and otherwise denying access to said shared limited resource.

14. Apparatus for fair and efficient allocation among competing classes of users of access to a common resource, comprising (a) an incrementable counter associated with each class of users, and a common counter, each counter having a count;

(b) means for incrementing the count in the counter associated with each class of users at a rate associated with said each class of users if said count is below a predefined maximum and for incrementing the count in said common counter if the count in any of said associated counters is at or above said predefined maximum;

(c) means for permitting a class of users to access said common resource if the count in the associated counter for said each class of users is non-zero, or if the count in the associated counter for said class of users is zero, provided that the count in said common counter is non-zero;

(d) means responsive to said permitting means for decrementing the count in either the associated counter for each class of users, or in the common counter, upon each use of said common resource by said each class of users.

15. Apparatus for sharing admission to a resource by a plurality of competing users on a fair and efficient basis, comprising:
means for allocating a nominal allowable admission rate to each of said competing users;
means for storing indicia of actual admissions to said resource by each of said competing users and an indication representing a difference, for all users, said difference being the difference between the nominal and actual admissions to said resource; and
means for admitting, in response to said stored indicia, any user that has been admitted to said resource at less than its nominal rate, and users that have exceeded their nominal rate, but only if said stored indication representing said difference is positive.

16. Apparatus for admitting N classes of users to a common resource on a fair and efficient basis, where N is an integer greater than 1, comprising:
a plurality of token banks, including one token bank for each of said N classes, each of said token banks designated as, plus one spare token bank, bank 'N+1', each of said token banks having a finite size;
means for assigning a rate, rate 'i', i=1, ..., N to each class i, rate 'i' representing the allocated admission rate for class i;
means for sending tokens to bank 'i' at rate 'i';
means for sending tokens that find a full token bank to said spare token bank;
means for discarding tokens sent to said spare token bank when said spare token bank is also full;
means for admitting a class i arrival to access said common resouce by first using a token from bank 'i' and if bank 'i' is empty, then using a token from said spare token bank and for blocking admission to said common resource if said spare token bank is also empty.

17. Apparatus for allocating access to a shared limited resource by a plurality of N requesters requesting access to said shared limited resource, said allocation being made such that each requester is granted access to said shared limited resource at a minimum guaranteed rate associated with said each requester and such that said shared limited resource is available for use by other requesters exceeding their minimum guaranteed rate only if some requesters have not used their entire allocation in the recent past, said apparatus comprising:
means for assigning credit to said each requester at said minimum guaranteed rate associated with said each requester,
means for associating with said each requester, a first sequence of banks selected from a set of M banks for storing credit assigned to said each requester, each of said M banks having a finite capacity, where M and N are integers greater than 1;
means for storing credit assigned to said each requester in the first bank in that requester's said first sequence of banks that is below its said capacity, or discarding said credit if none of said banks in said requester's said first sequence of banks is below said capacity;
means for associating with each requester, a second sequence of banks selected from said set of M banks for using stored credit; and
means for allowing a requester to gain access to said shared limited resource by withdrawing credit available in the first non-empty bank in said each requester's said second sequence of banks, and otherwise denying access to said shared limited resource.

18. Apparatus for allocating access to a common resource among N competing classes of users, comprising:
(a) M incrementable counters each having a predefined maximum, where M and N are integers greater than 1,
(b) means for incrementing said counters in a first sequence and at a rate established for each class of users, said means arranged to increment only ones of said M counters in said first sequence that have a count that is below said predefined maximum;
(c) means for decrementing said counters in a second sequence upon each use of said common resource by said class of users, and
(d) means for allowing access to said common resource to a class of users if the count in any of the counters in said second sequence established for said class of users is non-zero and for denying access to said common resource to a class of users if the count in all of the counters in said second sequence is zero.

19. Apparatus for sharing access to a common resource among N users, comprising
means for assigning a rate, rate 'i', to each of said N users, said rate indicating the minimum desired access for the $i^{th}$ user, where N is an integer greater than 1 and where $1 \leq i \leq N$;
means for storing indicia of the eligibility of any user to access said common resource in a series of M banks, each of said banks having a predetermined limit, limit 'i' where M is an integer greater than 1 and where $1 \leq j \leq M$;
means for incrementing the indicia in said M banks at rate 'i' up to respective limits for the $i^{th}$ user, in accordance with a first sequence associated with said user, said increment being discarded if all of said M banks in said first sequence are at said limit;
means for allowing the $i^{th}$ user to access said common resource if any banks in a second sequence of banks associated with said $i^{th}$ user is not empty; and
means for decrementing the indicia in the first bank in said second sequence that contains any indicia, upon granting of access to said common resource.

20. Apparatus for admitting users in N classes to a common resource on a fair and efficient basis, comprising:
M banks, where M and N are integers greater than 1;
means for establishing, for each of said N classes, a rate at which said class earns credit required to admit said class to said common resource;
means for establishing first and second sequences for each of said N classes, said first sequence indicating the order in which credit earned by said class is deposited in said M banks, and said second sequence indicating the order in which credit used by said class is withdrawn from said M banks;
means for depositing, for each of said N classes of users, credit earned at said rate established for said class, in said M banks in accordance with said first sequence, and discarding credit when all banks in said first sequence are full;

means for admitting users in each of N classes of users to said common resource by withdrawing credit from said M banks in accordance with said second sequence; and means for blocking admission to said common resource to a user in a class if all banks in said second sequence are empty.

21. The invention defined in claim 20 wherein $M = N + 1$, and wherein said first and second sequences are the same.

22. Apparatus for regulating access of multiclass arrivals to a common resource, comprising:
(1) means for storing credit earned by each class in a plurality of M banks each having a finite credit limit, where M is an integer greater than 1, wherein said storing means is arranged to:
(a) assign a rate at which each class earns credit; (b) establish a first sequence in which credit for each class is stored in said M banks; (c) deposit credit in the first bank in said first sequence that has not exceeded its credit limit; (d) discard credit if all banks in said first sequence have exceeded their credit limit; and
(2) means for regulating access to said common resource by arrivals from each class, wherein said regulating means is arranged to
(a) establish a second sequence in which arrivals from each class seek to use credit stored in said M banks; (b) allow an arrival to access said common resource by withdrawing credit in the first bank in said second sequence that has credit available; and (c) deny access to said common resource if no banks in said second sequence contain credit that can be withdrawn in accordance with paragraph (2)(b) above.

23. Apparatus for controlling admission of arrivals from users in N classes seeking access to a common resource, each of said users having an associated rate at which access to said common resource is guaranteed, comprising:
means for updating, in response to an arrival from a user in any of said classes, the credit in each of a plurality of M banks in accordance with the rate associated with each of said users, where M and N are integers greater than 1;
means for determining if said arrival is admitted to use said common resource or rejected; and
means for awaiting the next arrival,
wherein said updating means is arranged to:
(a) determine, for the first class, the amount of credit earned since the last update; (b) add the amount determined in (a) to the contents of the first bank in the sequence of banks associated with the first class; (c) determine if the bank is above its limit; (d) if so, set the contents of the bank at its limit and adding the excess credit to the next bank in the sequence; (e) repeat steps (a) to (d) for the remaining banks;
and wherein said determining means is arranged to:
(a) determine, in response to an arrival from a user in any of said classes, if the first bank in the sequence associated with said user contains sufficient credit required to permit said arrival to access said common resource; (b) if a positive result is determined in step (a), allow access to said common resource by said arrival by withdrawing credit from said bank; (c) if a negative result is determined in step (a), repeat step (a) with respect to the next bank in the sequence associated with said user.

24. A method for allocating access to a shared limited resource by a plurality of N requesters requesting access to said shared limited resource, said allocation being made such that each requester is granted access to said shared limited resource at a minimum guaranteed rate associated with said requester and such that said shared limited resource is available for use by other requesters exceeding their minimum guaranteed rate only if some requesters have not used their entire allocation in the recent past, said method comprising the steps of:
storing credit assigned to each requester at said minimum guaranteed rate associated with said requester, in the first of M banks in a first sequence of banks that is below its capacity, or discarding said credit if none of said banks in said first sequence is below its capacity, where M and N are integers greater than 1; and
allowing a requester to gain access to said shared limited resource by withdrawing credit available in the first one of said M banks in a second sequence of banks that contains credit.

25. Apparatus for sharing access to a common resource among N users, each user having an identity represented by an index 'i' where N is an integer greater than 1 and where $0 \leq i \leq N$; comprising
means for assigning a rate, rate 'i', to each of said N users, said rate indicating the minimum desired access for the $i^{th}$ user;
means for storing indicia of the eligibility of the $i^{th}$ user to access said resource in an associated token bank, bank 'i';
means for incrementing the indicia in bank 'i' at the rate rate 'i' up to a predetermined limit, limit 'i';
means for establishing a common token bank, bank 'N+1', said common token bank having a predetermined limit 'N+1';
means for incrementing the indicia in bank 'N+1' in the event that any of said other token banks is at its associated limit and said common token bank is not at limit 'N+1';
means for allowing the $i^{th}$ user to access said common resource if either bank 'i' or bank 'N+1' is not empty; and
means for decrementing the indicia in bank 'i' or bank 'N+1' upon granting of access to said common resource.

26. A method for admitting users in N classes to a common resource on a fair and efficient basis, comprising the steps of:
establishing M counters, where M and N are integers greater than 1, each of said counters having a count, said count in said counters ranging from 0 to a finite limit, in arbitrarily small increments, the difference between said count in a counter and its limit being designated as the space in said counter;
establishing, for each of said N classes, a rate at which said class earns credit, and a cost required to admit said class to said common resource;
establishing first and second sequences for each said classes, said first sequence indicating the order in which credit earned by said class is accounted for in said counters, and said second sequence indicating the order in which the debit incurred upon admittance of said class is accounted for in said counters;

for each of said classes, incrementing the count in said counters at said rate established for said class, said incrementing being performed in accordance with said first sequence, and discarding credit when all counters in said first sequence are at their limit;

admitting arrivals in each of said classes to said common resource by decrementing the counters by the cost associated with said class, said decrementing being performed in accordance with said second sequence; and blocking admission to said common resource to an arrival in a class if the sum of the counts in said counters in said second sequence does not add up to the admittance cost for said class.

27. A method for allocating access to a shared limited resource by a plurality of requesters requesting access to said shared limited resource, said allocation being made such that each requester is granted access to said shared limited resource at least at a minimum guaranteed rate associated with said each requester, comprising the steps of:

assigning credit to said each requester at said minimum guaranteed rate associated with said each requester;

storing each credit assigned to said each requester in one of a plurality of credit banks, each of said credit banks having a finite capacity, there being first and second sequences of said credit banks associated with said each requester, and each credit assigned to said each requester being (a) stored in the first one of the banks of said first sequence that is below said capacity or (b) discarded if none of the banks of said first sequence is below said capacity, and if at least one of the banks of said second sequence is non-empty, allowing a requester to gain access to said shared limited resource and concomitantly withdraw credit stored in the first non-empty one of said second sequence banks.

28. A method for admitting users in N classes to a common resource on a fair and efficient basis, comprising the steps of:

establishing M counters, where M and N are integers greater than 1, each of said counters having a count, said count in said counters ranging from 0 to a finite limit, in arbitrarily small increments, the difference between said count in a counter and its limit being designated as the space in said counter;

establishing, for each of said N classes, a rate at which said class earns credit, and a cost required to admit said class to said common resource;

establishing first and second sequences for each said classes, said first sequence indicating the order in which credit earned by said class is accounted for in said counters, and said second sequence indicating the order in which the debit incurred upon admittance of said class is accounted for in said counters;

for each of said classes, decrementing the count in said counters at said rate established for said class, said decrementing being performed in accordance with said first sequence, and discarding credit when all counters in said first sequence are empty;

admitting arrivals in each of said classes to said common resource by incrementing the counters by the cost associated with said class, said incrementing being performed in accordance with said second sequence; and blocking admission to said common resource to an arrival in a class if the sum of the space in said counters in said second sequence does not add up to the admittance cost for said class.

* * * * *